United States Patent
Akiya et al.

(10) Patent No.: US 10,138,719 B2
(45) Date of Patent: Nov. 27, 2018

(54) METHOD OF EXTRACTING BITUMEN FROM OIL SANDS WITH A PROPYLENE OXIDE CAPPED GLYCOL

(71) Applicant: Dow Global Technologies LLC, Midland, MI (US)

(72) Inventors: Naoko Akiya, Missouri City, TX (US); Edward D. Daugs, Midland, MI (US); Felipe A. Donate, Midland, MI (US); Harpreet Singh, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 170 days.

(21) Appl. No.: 15/119,149

(22) PCT Filed: Mar. 20, 2015

(86) PCT No.: PCT/US2015/021693
§ 371 (c)(1),
(2) Date: Aug. 16, 2016

(87) PCT Pub. No.: WO2015/148296
PCT Pub. Date: Oct. 1, 2015

(65) Prior Publication Data
US 2017/0051597 A1 Feb. 23, 2017

Related U.S. Application Data

(60) Provisional application No. 61/971,165, filed on Mar. 27, 2014.

(51) Int. Cl.
*E21B 43/24* (2006.01)
*C10G 33/04* (2006.01)
*C10G 1/04* (2006.01)
*C09K 8/592* (2006.01)

(52) U.S. Cl.
CPC .............. *E21B 43/24* (2013.01); *C09K 8/592* (2013.01); *C10G 1/045* (2013.01); *C10G 33/04* (2013.01); *C10G 2300/4037* (2013.01)

(58) Field of Classification Search
CPC ......... E21B 43/24; C09K 8/592; C10G 1/045; C10G 2300/4307; C10G 33/04
USPC ........................................................ 166/303
See application file for complete search history.

(56) References Cited

U.S. PATENT DOCUMENTS

| | | | | |
|---|---|---|---|---|
| 5,080,809 A | * | 1/1992 | Stahl | C08F 226/06 166/270.1 |
| 2011/0053810 A1 | * | 3/2011 | Norman | C09K 8/035 507/205 |
| 2016/0069172 A1 | * | 3/2016 | Akiya | C09K 8/592 166/305.1 |

* cited by examiner

*Primary Examiner* — Silvana C Runyan

(57) ABSTRACT

Oil sands may be surface mined and transported to a treatment area or may be treated directly by means of an in situ process of oil sand deposits that are located too deep for strip mining. A bitumen recovery process may be used to extract bitumen from oil sands. Specifically, the bitumen recover process involves a step of treating oil sands with a propylene oxide capped glycol ether described by the structure:

$$RO-(C_2H_4O)_n-CH_2CH(CH_3)OH$$

wherein R is a linear, branched, or cyclic alkyl, phenyl, alkyl phenyl group and n is 1 to 10.

7 Claims, No Drawings

METHOD OF EXTRACTING BITUMEN FROM OIL SANDS WITH A PROPYLENE OXIDE CAPPED GLYCOL

FIELD OF THE INVENTION

The present invention relates to the recovery of bitumen from oil sands. More particularly, the present invention is an improved method for bitumen recovery from oil sands through either surface mining or in situ recovery. The improvement is the use of a propylene oxide capped glycol ether as an extraction aid in the water and/or steam used in the bitumen recovery process.

BACKGROUND OF THE INVENTION

Deposits of oil sands are found around the world, but most prominently in Canada, Venezuela, and the United States. These oil sands contain significant deposits of heavy oil, typically referred to as bitumen. The bitumen from these oil sands may be extracted and refined into synthetic oil or directly into petroleum products. The difficulty with bitumen lies in that it typically is very viscous, sometimes to the point of being more solid than liquid. Thus, bitumen typically does not flow as less viscous, or lighter, crude oils do.

Because of the viscous nature of bitumen, it cannot be produced from a well drilled into the oil sands as is the case with lighter crude oil. This is so because the bitumen simply does not flow without being first heated, diluted, and/or upgraded. Since normal oil drilling practices are inadequate to produce bitumen, several methods have been developed over several decades to extract and process oil sands to remove the bitumen. For shallow deposits of oil sands, a typical method includes surface extraction, or mining, followed by subsequent treatment of the oil sands to remove the bitumen.

The development of surface extraction processes has occurred most extensively in the Athabasca field of Canada. In these processes, the oil sands are mined, typically through strip or open pit mining with draglines, bucket-wheel excavators, and, more recently, shovel and truck operations. The oil sands are then transported to a facility to process and remove the bitumen from the sands. These processes typically involve a solvent of some type, most often water or steam, although other solvents, such as hydrocarbon solvents, have been used.

After excavation, a hot water extraction process is typically used in the Athabasca field in which the oil sands are mixed with water at temperatures ranging from approximately 35° C. to 75° C., with recent improvements lowering the temperature necessary to the lower portion of the range. An extraction agent, such as sodium hydroxide (NaOH), surfactants, and/or air may be mixed with the oil sands.

Water is added to the oil sands to create an oil sands slurry, to which additives such as NaOH may be added, which is then transported to an extraction plant, typically via a pipeline. Inside a separation vessel, the slurry is agitated and the water and NaOH releases the bitumen from the oil sands. Air entrained with the water and NaOH attaches to the bitumen, allowing it to float to the top of the slurry mixture and create a froth. The bitumen froth is further treated to remove residual water and fines, which are typically small sand and clay particles. The bitumen is then either stored for further treatment or immediately treated, either chemically or mixed with lighter petroleum products, and transported by pipeline for upgrading into synthetic crude oil. Unfortunately, this method cannot be used for deeper tar sand layers.

In situ techniques are necessary to recover deeper oil in well production. It is estimated that around 80 percent of the Alberta tar sands and almost all of the Venezuelan tar sands are too far below the surface to use open pit mining.

In well production, referred to as in situ recovery, Cyclic Steam Stimulation (CSS) is the conventional "huff and puff" in situ method whereby steam is injected into the well at a temperature of 250° C. to 400° C. The steam rises and heats the bitumen, decreasing its viscosity. The well is allowed to sit for days or weeks, and then hot oil mixed with condensed steam is pumped out for a period of weeks or months. The process is then repeated. Unfortunately, the "huff and puff" method requires the site to be shut down for weeks to allow pumpable oil to accumulate. In addition to the high cost to inject steam, the CSS method typically results in 20 to 25 percent recovery of the available oil.

Steam Assisted Gravity Drainage (SAGD) is another in situ method where two horizontal wells are drilled in the tar sands, one at the bottom of the formation and another five meters above it. The wells are drilled in groups off of central pads. These wells may extend for miles in all directions. Steam is injected into the upper well, thereby melting the bitumen which then flows into the lower well. The resulting liquid oil mixed with condensed steam is subsequently pumped to the surface. Typical recovery of the available oil is 40 to 60 percent.

The above methods have many costs, environmental and safety problems associated with them. For example, the use of large amounts of steam is energy intensive and requires the processing and disposal of large amounts of water. Currently, tar sands extraction and processing requires several barrels of water for each barrel of oil produced. Strip mining and further treatment results in incompletely cleaned sand, which requires further processing, before it can be returned to the environment. Further, the use of a large quantity of caustic in surface mining not only presents process safety hazards but also contributes formation of fine clay particles in tailings, the disposal of which is a major environmental problem.

Thus, there remains a need for efficient, safe and cost-effective methods to improve the recovery of bitumen from oil sands.

SUMMARY OF THE INVENTION

The present invention is an improved bitumen recovery process comprising the step of treating oil sands with a propylene oxide capped glycol ether wherein the treatment is to oil sands recovered by surface mining or in situ production to oil sands in a subterranean reservoir.

In one embodiment of the bitumen recovery process described herein above, the propylene oxide capped glycol ether is described by the structure:

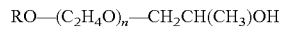

wherein R is a linear, branched, cyclic alkyl, phenyl, or alkyl phenyl group and n is 1 to 10, preferably 1 to 3, preferably the propylene oxide capped glycol ether is one of, or a combination thereof, the propylene oxide capped n-butyl ether of ethylene glycol, n-butyl ether of diethylene glycol, n-pentyl ether of ethylene glycol, n-pentyl ether of diethylene glycol, 2-methyl-1-pentyl ether of ethylene glycol, 2-methyl-1-pentyl ether of diethylene glycol, n-hexyl ether of ethylene glycol, n-hexyl ether of diethylene glycol, n-heptyl ether of ethylene glycol, n-heptyl ether of diethylene glycol, n-octyl ether of ethylene glycol, n-octyl ether of diethylene glycol, 2-ethylhexyl ether of ethylene glycol, 2-ethylhexyl ether of diethylene glycol, 2-propylheptyl ether of ethylene glycol, 2-propylheptyl ether of diethylene glycol, phenyl ether of ethylene glycol, phenyl ether of diethylene glycol, cyclohexyl ether of ethylene glycol, or cyclohexyl ether of diethylene glycol.

In another embodiment of the present invention, the bitumen recovery process by surface mining described herein above comprises the steps of: i) surface mining oil sands, ii) preparing an aqueous slurry of the oil sands, iii) treating the aqueous slurry with the propylene oxide capped glycol ether, iv) agitating the treated aqueous slurry, v) transferring the agitated treated aqueous slurry to a separation tank, and vi) separating the bitumen from the aqueous portion, preferably the propylene oxide capped glycol ether is present in the aqueous slurry in an amount of from 0.01 to 10 weight percent based on the weight of the oil sands.

In another embodiment of the present invention, the bitumen recovery process by in situ production described herein above comprises the steps of: i) treating a subterranean reservoir of oil sands by injecting steam containing the propylene oxide capped glycol ether into a well, and ii) recovering the bitumen from the well, preferably the concentration of the propylene oxide capped glycol ether in the steam is in an amount of from 100 ppm to 10 weight percent.

DETAILED DESCRIPTION OF THE EMBODIMENTS

The separation of bitumen and/or heavy oil from oil sands is accomplished by, but not limited to, two methods, surface mining or in situ recovery sometimes referred to as well production. The oil sands may be recovered by surface or strip mining and transported to a treatment area. A good summary can be found in the article "Understanding Water-Based Bitumen Extraction from Athabasca Oil Sands", J. Masliyah, et al., *Canadian Journal of Chemical Engineering*, Volume 82, August 2004. The basic steps in bitumen recovery via surface mining include: extraction, froth treatment, tailings treatment, and upgrading. The steps are interrelated; the mining operation affects the extraction and in turn the extraction affects the upgrading operation.

Typically, in commercial bitumen recovery operations, the oil sand is mined in an open-pit mine using trucks and shovels. The mined oil sands are transported to a treatment area. The extraction step includes crushing the oil sand lumps and mixing them with (recycle process) water in mixing boxes, stirred tanks, cyclo-feeders or rotary breakers to form a conditioned oil sands slurry. The conditioned oil sands slurry is introduced to hydrotransport pipelines or to tumblers, where the oil sand lumps are sheared and size reduction takes place. Within the tumblers and/or the hydrotransport pipelines, bitumen is recovered or "released", or "liberated", from the sand grains. Chemical additives can be added during the slurry preparation stage; for examples of chemicals known in the art see US2008/0139418, incorporated by reference herein in its entirety. In typical operations, the operating slurry temperature ranges from 35° C. to 75° C., preferably 40° C. to 55° C.

Entrained or introduced air attaches to bitumen in the tumblers and hydrotransport pipelines creating froth. In the froth treatment step, the aerated bitumen floats and is subsequently skimmed off from the slurry. This is accomplished in large gravity separation vessels, normally referred to as primary separation vessels (PSV), separation cells (Sep Cell) or primary separation cells (PSC). Small amounts of bitumen droplets (usually un-aerated bitumen) remaining in the slurry are further recovered using either induced air flotation in mechanical flotation cells and tailings oil recovery vessels, or cyclo-separators and hydrocyclones. Generally, overall bitumen recovery in commercial operations is about 88 to 95 percent of the original oil in place. The recovered bitumen in the form of froth normally contains 60 percent bitumen, 30 percent water and 10 percent solids.

The bitumen froth recovered as such is then de-aerated, and diluted (mixed) with solvents to provide sufficient density difference between water and bitumen and to reduce the bitumen viscosity. The dilution by a solvent (e.g., naphtha or hexane) facilitates the removal of the solids and water from the bitumen froth using inclined plate settlers, cyclones and/or centrifuges. When a paraffinic diluent (solvent) is used at a sufficiently high diluent to bitumen ratio, partial precipitation of asphaltenes occurs. This leads to the formation of composite aggregates that trap the water and solids in the diluted bitumen froth. In this way gravity separation is greatly enhanced, potentially eliminating the need for cyclones or centrifuges.

In the tailings treatment step, the tailings stream from the extraction plant goes to the tailings pond for solid-liquid separation. The clarified water is recycled from the pond back to the extraction plant. To accelerate tailings handling, gypsum may be added to mature fine tailings to consolidate the fines together with the coarse sand into a non-segregating mixture. This method is referred to as the consolidated (composite) tailing (CT) process. CT is disposed of in a geotechnical manner that enhances its further dewatering and eventual reclamation. Optionally, tailings from the extraction plant are cycloned, with the overflow (fine tailings) being pumped to thickeners and the cyclone underflow (coarse tailings) to the tailings pond. Fine tailings are treated with flocculants, then thickened and pumped to a tailings pond. Further, the use of paste technology (addition of flocculants/polyelectrolytes) or a combination of CT and paste technology may be used for fast water release and recycle of the water in CT to the extraction plant for bitumen recovery from oil sands.

In the final step, the recovered bitumen is upgraded. Upgrading either adds hydrogen or removes carbon in order to achieve a balanced, lighter hydrocarbon that is more valuable and easier to refine. The upgrading process also removes contaminants such as heavy metals, salts, oxygen, nitrogen and sulfur. The upgrading process includes one or more steps such as: distillation wherein various compounds are separated by physical properties, coking, hydro-conversion, solvent deasphalting to improve the hydrogen to carbon ratio, and hydrotreating which removes contaminants such as sulfur.

In one embodiment of the present invention, the improvement to the process of recovering bitumen from oil sands is the addition of a propylene oxide capped glycol ether during the slurry preparation stage. The sized material is added to a slurry tank with agitation and combined with a propylene oxide capped glycol ether. The propylene oxide capped glycol ether may be added to the oil sands slurry neat or as an aqueous solution having a concentration of from 100 ppm to 10 weight percent propylene oxide capped glycol ether based on the total weight of the propylene oxide capped glycol ether solution. Preferably, the propylene oxide capped glycol ether is present in the aqueous oil sands slurry in an amount of from 0.01 to 10 weight percent based on the weight of the oil sands.

Preferred propylene oxide capped glycol ethers of the present invention are represented by the following formula:

$$RO-(C_2H_4O)_n-CH_2CH(CH_3)OH$$

wherein R is a linear, branched, or cyclic alkyl, phenyl, alkyl phenyl group and n is 1 to 10, preferably 1 to 3.

Preferred propylene oxide capped glycol ethers of the present invention are the propylene oxide capped n-butyl ether of ethylene glycol, n-butyl ether of diethylene glycol, n-pentyl ether of ethylene glycol, n-pentyl ether of diethylene glycol, 2-methyl-1-pentyl ether of ethylene glycol, 2-methyl-1-pentyl ether of diethylene glycol, n-hexyl ether of ethylene glycol, n-hexyl ether of diethylene glycol, n-heptyl ether of ethylene glycol, n-heptyl ether of diethylene glycol, n-octyl ether of ethylene glycol, n-octyl ether of diethylene glycol, 2-ethylhexyl ether of ethylene glycol, 2-ethylhexyl ether of diethylene glycol, 2-propylheptyl ether of ethylene glycol, 2-propylheptyl ether of diethylene glycol, phenyl ether of ethylene glycol, phenyl ether of diethylene glycol, cyclohexyl ether of ethylene glycol, cyclohexyl ether of diethylene glycol, or mixtures thereof.

The propylene oxide capped glycol ether solution/oil sand slurry is typically agitated from 5 minutes to 4 hours, preferably for an hour or less. Preferably, the propylene oxide capped glycol ether solution oil sands slurry is heated to equal to or greater than 35° C., more preferably equal to or greater than 40° C., more preferably equal to or greater than 55° C., more preferably equal to or greater than 60° C. Preferably, the propylene oxide capped glycol ether solution oil sands slurry is heated to equal to or less than 100° C., more preferably equal to or less than 80° C., and more preferably equal to or less than 75° C.

As outlined herein above, the propylene oxide capped glycol ether treated slurry may be transferred to a separation tank, typically comprising a diluted detergent solution, wherein the bitumen and heavy oils are separated from the aqueous portion. The solids and the aqueous portion may be further treated to remove any additional free organic matter.

In another embodiment of the present invention, bitumen is recovered from oil sands through well production wherein the propylene oxide capped glycol ether as described herein above can be added to oil sands by means of in situ treatment of the oil sand deposits that are located too deep for strip mining. The two most common methods of in situ production recovery are cyclic steam stimulation (CSS) and steam-assisted gravity drainage (SAGD). CSS can utilize both vertical and horizontal wells that alternately inject steam and pump heated bitumen to the surface, forming a cycle of injection, heating, flow and extraction. SAGD utilizes pairs of horizontal wells placed one over the other within the bitumen pay zone. The upper well is used to inject steam, creating a permanent heated chamber within which the heated bitumen flows by gravity to the lower well, which extracts the bitumen. However, new technologies, such as vapor recovery extraction (VAPEX) and cold heavy oil production with sand (CHOPS) are being developed.

The basic steps in the in situ treatment to recover bitumen from oil sands includes: steam injection into a well, recovery of bitumen from the well, and dilution of the recovered bitumen, for example with condensate, for shipping by pipelines.

In accordance with this method, the propylene oxide capped glycol ether is used as a steam additive in a bitumen recovery process from a subterranean oil sand reservoir. The mode of steam injection may include one or more of steam drive, steam soak, or cyclic steam injection in a single or multi-well program. Water flooding may be used in addition to one or more of the steam injection methods listed herein above.

Typically, the steam is injected into an oil sands reservoir through an injection well, and wherein formation fluids, comprising reservoir and injection fluids, are produced either through an adjacent production well or by back flowing into the injection well.

In most oil sand reservoirs, a steam temperature of at least 180° C., which corresponds to a pressure of 150 psi (1.0 MPa), or greater is needed to mobilize the bitumen. Preferably, the propylene oxide capped glycol ether-steam injection stream is introduced to the reservoir at a temperature in the range of from 150° C. to 300° C., preferably 180° C. to 260° C. The particular steam temperature and pressure used in the process of the present invention will depend on such specific reservoir characteristics as depth, overburden pressure, pay zone thickness, and bitumen viscosity, and thus will be worked out for each reservoir.

It is preferable to inject the propylene oxide capped glycol ether simultaneously with the steam in order to ensure or maximize the amount of propylene oxide capped glycol ether actually moving with the steam. In some instances, it may be desirable to precede or follow a steam-propylene oxide capped glycol ether injection stream with a steam-only injection stream. In this case, the steam temperature can be raised above 260° C. during the steam-only injection. The term "steam" used herein is meant to include superheated steam, saturated steam, and less than 100 percent quality steam.

For purposes of clarity, the term "less than 100 percent quality steam" refers to steam having a liquid water phase present. Steam quality is defined as the weight percent of dry steam contained in a unit weight of a steam-liquid mixture. "Saturated steam" is used synonymously with "100 percent quality steam". "Superheated steam" is steam which has been heated above the vapor-liquid equilibrium point. If super heated steam is used, the steam is preferably super heated to between 5 to 50° C. above the vapor-liquid equilibrium temperature, prior to adding the propylene oxide capped glycol ether.

The propylene oxide capped glycol ether may be added to the steam neat or as a concentrate. If added as a concentrate, it may be added as a 1 to 99 weight percent solution in water. Preferably, the propylene oxide capped glycol ether is substantially volatilized and carried into the reservoir as an aerosol or mist. Here again, the rationale is to maximize the amount of propylene oxide capped glycol ether traveling with the steam into the reservoir.

The propylene oxide capped glycol ether is preferably injected intermittently or continuously with the steam, so that the steam-propylene oxide capped glycol ether injection stream reaches the downhole formation through common tubing. The rate of propylene oxide capped glycol ether addition is adjusted so as to maintain the preferred propylene oxide capped glycol ether concentration of 100 ppm to 10 weight percent in steam. The rate of steam injection for a typical oil sands reservoir might be on the order of enough steam to provide an advance through the formation of from 1 to 3 feet/day.

EXAMPLES

Example 1 is 1-(2-butoxyethoxy) propan-2-ol, a propylene oxide capped glycol ether of the present invention. It is prepared as follows: A 2 L Parr reactor is charged with 898.3 g (7.602 mol) of ethylene glycol butyl ether and 4.00 g of powdered potassium hydroxide (KOH). The system is sealed and pressure checked with nitrogen, then heated to 120° C. A total of 221.9 g (3.821 mol) of propylene oxide is added at a rate of 1 to 5 g/min over 50 minutes. The reactor pressure rises from 11 to 42 psi during the addition, then is increased to 200 psi by blowing through the addition cylinder with nitrogen. The reactor is held at 120° C. for an additional 3.5 hours, then cooled and the reaction product unloaded to afford 1104.35 g of clear solution. Phosphoric acid (3.411 g of 85%) is added dropwise to the product solution; after stirring for 5 minutes, the solution is titrated for residual base (0.0% KOH). The clear solution (1081.5 g) is charged to a 2 L distillation flask for vacuum distillation. Six fractions are collected and fractions 4, 5, and 6 are combined to afford 334 g of 1-(2-butoxyethoxy)propan-2-ol (99.75 area %, by GC analysis).

Example 2 is 1-(2-hexoxyethoxy) propan-2-ol a propylene oxide capped glycol ether of the present invention. It is prepared as follows: A 2 L Parr reactor is charged with 1000.5 g (6.842 mol) of ethylene glycol hexyl ether and 4.2 g of powdered KOH. The system is sealed and pressure checked with nitrogen, then heated to 120° C. A total of 256.8 g (4.421 mol) of propylene oxide is added at a rate of 1 to 5 g/min over 56 minutes. The reactor pressure rises from 16 to 55 psi during the addition, then is increased to 200 psi by blowing through the addition cylinder with nitrogen. The reactor is held at 120° C. for an additional 2 hours, then it is cooled and the reaction product unloaded. The clear solution (1240 g) is combined with 471.3 g of a second reaction product from 408.7 g (2.795 mol) of ethylene glycol monohexyl ether, 1.224 g of powdered KOH, and 82.3 g (1.42 mol) of propylene oxide and mixed with 4.058 g of 85% phosphoric acid; after stirring for 5 minutes, the solution is titrated for residual base. The clear solution (1690.9 g) is charged to a 3 L distillation flask for vacuum distillation. Seven fractions are collected and fractions 6 and 7 are combined to afford 607.4 g of propylene oxide capped ethylene glycol of hexyl ether (99.84 area %, by GC analysis).

Comparative Example A is diethylene glycol of butyl ether available as Butyl CARBITOL™ from The Dow Chemical Company.

Comparative Example B is diethylene glycol of hexyl ether available as Hexyl CARBITOL from The Dow Chemical Company.

Oil/water interfacial tension (IFT) is measured using a pendant drop tensiometer, with decane as the model oil. 2000 ppm solution of the glycol ether in water is prepared, and a decane drop is created with a syringe into that solution. All measurements are made under ambient conditions.

Steam flooding experiments are conducted as follows: steam is generated by pumping 1 mL/min of water from a reservoir through a heat exchanger. When testing a glycol ether, the water is replaced with a 4000 ppm glycol ether solution in water. The produced steam or steam+glycol ether vapor mix is injected to the top of a stainless steel chamber containing a synthetic oil sand core, prepared by mechanically compressing a 100 g sample of mined oil sand. Steam injection is maintained for approximately three hours, during which the produced bitumen and condensate are collected from the bottom of the chamber through a valve, which remains open to the atmosphere. The bed temperature is around 100° C.

Steam soaking experiments are conducted as follows: A 500 mL Parr reactor is loaded with approximately 150 mL of water or 2.5 wt % additive/water mix. A synthetic oil sand core prepared by mechanically compressing 50 g of mined oil sand is placed in a mesh basket and hung from the lid of the Parr reactor such that the core is not touching the liquid phase at the bottom. The reactor is sealed and then heated to 188° C. for 4 hours. After cooling the reactor overnight, the produced oil and the spent sand are analyzed to determine the oil recovery.

Table 1 summarizes the experimental results for Examples 1 and 2 and Comparative Examples A and B. The experimental uncertainty of IFT measurement is less than 0.5 mN/m. The experimental uncertainty of steam flooding data is less than 1 wt %. The experimental uncertainty of steam soaking data is less than 10 wt %.

TABLE 1

|  | Decane/Water IFT (mN/m) at 2000 ppm | Oil Recovery from Steam Flooding at 4000 ppm | Oil Recovery from Steam Soaking at 2.5% |
|---|---|---|---|
| Comparative Example A | 32.7 | 18% | 18% |
| Example 1 | 32.2 | 20% | 33% |
| Comparative Example B | 20.2 | 25% | 45% |
| Example 2 | 21.6 | 27% | 49% |

Large scale 1D gravity drainage experiments are conducted as follows: A synthetic bitumen-saturated core of 5 inch length is prepared and is suspended inside a core holder. The bitumen-saturated core is prepared in a mesh sleeve which allows steam to diffuse in the core and interact. This arrangement ensures that the released bitumen flow only under the action of gravity and not due to any external pressure. To prolong the existing of condensation of steam front inside the core, a cold finger is used to maintain temperature gradient in the radial direction across the core. Steam alone (e.g., without any glycol ether) is run as a baseline. Examples 1 and 2 are injected into the steam line directly at a rate which is to provide a final glycol ether concentration of 4000 ppm. The chamber pressure is controlled by a back pressure regulator (BPR) attached at the bottom of the chamber. The pressure inside the chamber is increased in incremental steps of 20 psi and is continued utilizing a standard operating procedure until a final pressure of 150 psi is reached, where it is held constant. The drained bitumen and water is collected as a function of time and is later quantified using solvent-extraction and gravity method to obtain recovery v/s time plot. Uncondensed vapors coming out of the chamber is arrested using a vapor trap. Drainage experiments are run for around 6 hours. The produced oil and the spent sand are analyzed to determine the oil recovery. Table 2 shows the total oil recovered based on the amount of oil left in the spent sand at the end of the run.

TABLE 2

|  | Oil Recovery |
|---|---|
| Steam Only | 30% |
| Example 1, @ 4000 ppm | 48% |
| Example 2, @ 4000 ppm | 41% |

What is claimed is:

1. A bitumen recovery process comprising a step of treating oil sands with a propylene oxide capped glycol ether, wherein:
   the oil sands are recovered by surface mining and transported to a treatment area for the step of treating the oil sands with the propylene oxide capped glycol ether or the oil sands are recovered by in situ production and in situ treatment occurs during the step of treating the oil sands with the propylene oxide capped glycol ether, and the propylene oxide capped glycol ether is described by the following structure:

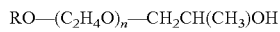

$$RO-(C_2H_4O)_n-CH_2CH(CH_3)OH$$

wherein R is a linear, branched, cyclic alkyl, phenyl, or alkyl phenyl group and n is 1 to 10.

2. The bitumen recovery process of claim 1 by surface mining comprising additional steps of:
   i) surface mining the oil sands,
   ii) preparing an aqueous slurry of the oil sands,
   iii) treating the aqueous slurry with the propylene oxide capped glycol ether,
   iv) agitating the treated aqueous slurry to form an agitated treated aqueous slurry,
   v) transferring the agitated treated aqueous slurry to a separation tank, and
   vi) separating the bitumen from an aqueous portion.

3. The bitumen recovery process of claim 2 wherein the propylene oxide capped glycol ether is present in the aqueous slurry in an amount of from 0.01 to 10 weight percent based on the weight of the oil sands.

4. The bitumen recovery process of claim 1 by in situ production comprising additional steps of:
   i) treating a subterranean reservoir of oil sands by injecting steam containing the propylene oxide capped glycol ether into a well, and
   ii) recovering the bitumen from the well.

5. The bitumen recovery process of claim 4 wherein the concentration of the propylene oxide capped glycol ether in the steam is in an amount of from 100 ppm to 10 weight percent.

6. The bitumen recovery process of claim 1 wherein the propylene oxide capped glycol ether is a propylene oxide capped of: n-butyl ether of ethylene glycol, n-butyl ether of diethylene glycol, n-pentyl ether of ethylene glycol, n-pentyl ether of diethylene glycol, 2-methyl-1-pentyl ether of ethylene glycol, 2-methyl-1-pentyl ether of diethylene glycol, n-hexyl ether of ethylene glycol, n-hexyl ether of diethylene glycol, n-heptyl ether of ethylene glycol, n-heptyl ether of diethylene glycol, n-octyl ether of ethylene glycol, n-octyl ether of diethylene glycol, 2-ethylhexyl ether of ethylene glycol, 2-ethylhexyl ether of diethylene glycol, 2-propylheptyl ether of ethylene glycol, 2-propylheptyl ether of diethylene glycol, phenyl ether of ethylene glycol, phenyl ether of diethylene glycol, cyclohexyl ether of ethylene glycol, cyclohexyl ether of diethylene glycol, or mixtures thereof.

7. The bitumen recovery process of claim 1 wherein:
   when the oil sands are recovered by surfacing mining, an aqueous slurry of the oil sands is prepared and the step of treating the oil sands includes adding the propylene oxide capped glycol ether to the aqueous slurry, and
   when the oil sands are recovered by in situ production the step of treating the oil sands includes injecting steam containing the propylene oxide capped glycol ether into a well having a subterranean reservoir that includes the oil sands.

* * * * *